United States Patent
Thornberry et al.

(10) Patent No.: US 9,708,497 B2
(45) Date of Patent: Jul. 18, 2017

(54) COLOR-TO-COLOR INK BLEED CONTROL ON MEDIA

(75) Inventors: Matthew Thornberry, Corvallis, OR (US); Mary E. Austin, Corvallis, OR (US); Larrie Deardurff, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 192 days.

(21) Appl. No.: 14/391,940

(22) PCT Filed: Apr. 20, 2012

(86) PCT No.: PCT/US2012/034387
§ 371 (c)(1),
(2), (4) Date: Oct. 10, 2014

(87) PCT Pub. No.: WO2013/158111
PCT Pub. Date: Oct. 24, 2013

(65) Prior Publication Data
US 2015/0065603 A1    Mar. 5, 2015

(51) Int. Cl.
*B41M 5/00* (2006.01)
*B41M 7/00* (2006.01)
*C08K 5/06* (2006.01)
*C09D 5/14* (2006.01)
*C09D 11/326* (2014.01)
*C09D 11/38* (2014.01)
*C09D 11/40* (2014.01)
*C09D 125/08* (2006.01)

(52) U.S. Cl.
CPC ............... *C09D 11/40* (2013.01); *C08K 5/06* (2013.01); *C09D 5/14* (2013.01); *C09D 11/326* (2013.01); *C09D 11/38* (2013.01); *C09D 125/08* (2013.01); *B41M 5/0017* (2013.01); *B41M 7/0018* (2013.01)

(58) Field of Classification Search
CPC ........ C09D 11/40; C09D 11/326; C09D 5/14; C09D 125/08; C09D 11/38; C08K 5/06; B41M 5/0017; B41M 7/0018
See application file for complete search history.

(56) References Cited

U.S. PATENT DOCUMENTS

| | | |
|---|---|---|
| 5,730,790 A | 3/1998 | Rehman |
| 6,500,880 B1 | 12/2002 | Parazak |
| 6,536,891 B2 | 3/2003 | Oyanagi |
| 7,846,247 B2 | 12/2010 | Mizutani et al. |
| 2005/0036021 A1 | 2/2005 | Ito et al. |
| 2006/0132565 A1 | 6/2006 | Szajewski et al. |
| 2007/0028800 A1* | 2/2007 | Szajewski ............. C09D 11/40 106/31.6 |
| 2007/0120928 A1 | 5/2007 | Ma et al. |
| 2008/0071007 A1 | 3/2008 | Spinelli |
| 2008/0207805 A1 | 8/2008 | Blease et al. |
| 2009/0258156 A1 | 10/2009 | Chretien et al. |

FOREIGN PATENT DOCUMENTS

EP    1995287 A1    11/2008

* cited by examiner

*Primary Examiner* — Patrick Niland
(74) *Attorney, Agent, or Firm* — Dierker & Kavanaugh, P.C.

(57) ABSTRACT

In one example, an ink set with color-to-color bleed control on media includes a first ink in the ink set with a bound dispersant and a first amount of surfactant and a second ink in the ink set with a free dispersant and a second amount of surfactant greater than the first amount of surfactant. A method for forming an ink set with reduced color-to-color bleed is also provided.

18 Claims, 7 Drawing Sheets

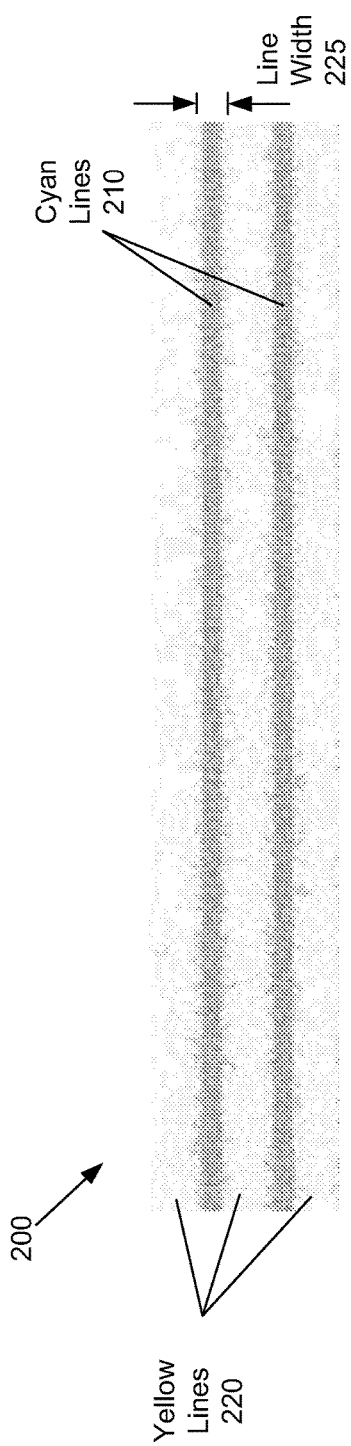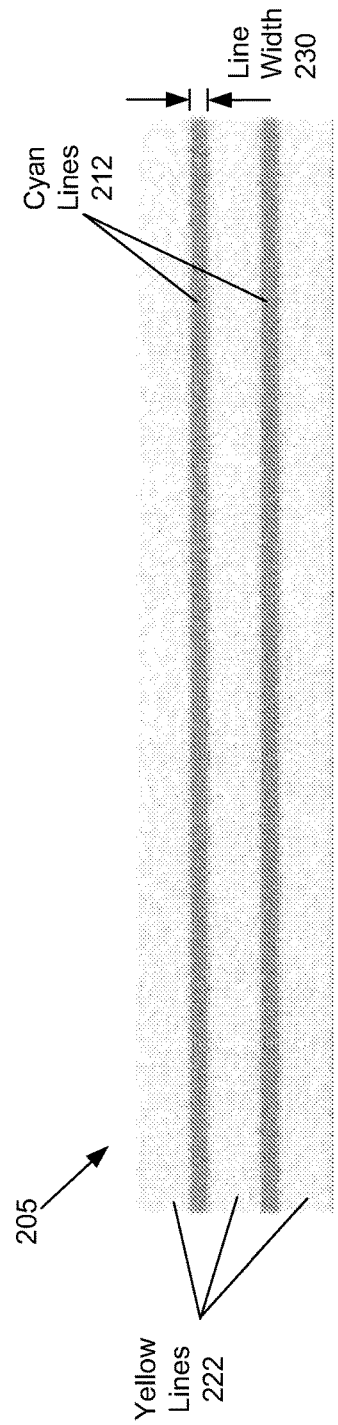

600

A first ink in the ink set is formed by adding carrier fluid and a first amount of a surfactant to pigment with chemisorbed (bound) dispersants and mixing.
605

A second ink in the ink set is formed by adding carrier fluid and a second amount of the surfactant to pigments with physisorbed (free) dispersants and mixing. The second amount of surfactant is greater than the first amount of surfactant by 16% to 34%, the second ink having a static surface tension that is lower than the surface tension of the first ink by < 2mN/m.
610

*Fig. 6*

COLOR-TO-COLOR INK BLEED CONTROL ON MEDIA

BACKGROUND

When printing images on media, different colors of ink can be deposited adjacent to each other. Color-to-color bleed between the adjacent colors in the images can produce undesirable blurring and feathering. This bleed reduces the quality of the image.

BRIEF DESCRIPTION OF THE DRAWINGS

The accompanying drawings illustrate various examples of the principles described herein and are a part of the specification. The illustrated examples are merely examples and do not limit the scope of the claims.

FIGS. 2A and 2B are test coupons showing bleeding between different colored inks in an ink set, according to one example of principles described herein.

FIG. 6 is a flowchart of a method for forming an ink set with color-to-color bleed control on media, according to one example of principles described herein.

Throughout the drawings, identical reference numbers designate similar, but not necessarily identical, elements.

DETAILED DESCRIPTION

Figure 1:
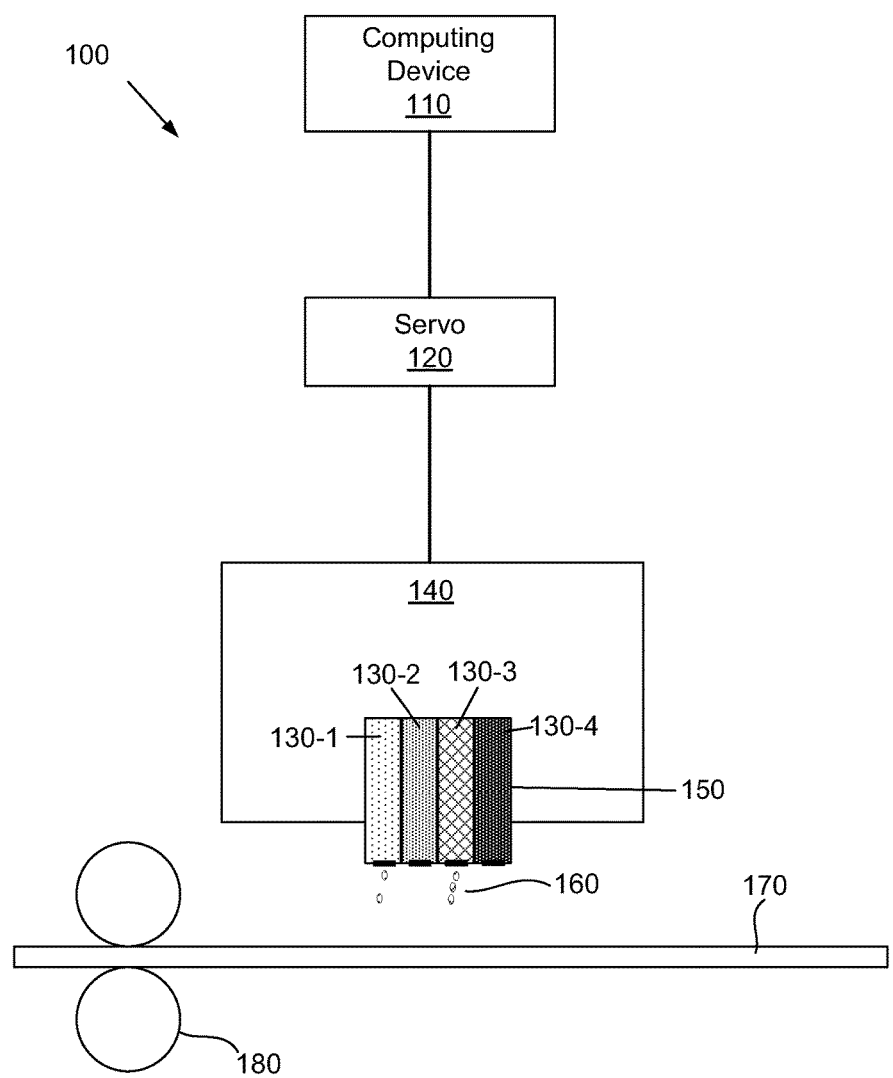
FIG. 1 is a diagram of a printing system for dispensing inks from an ink set onto a substrate to form a desired image, according to one example of principles described herein.

Ink jet printing has a number of advantages, including practically no warm up time, quiet operation, low cost per printed page and high print quality. An ink jet printer typically includes an ink set that includes various colors of ink that are designed to be printed together to form the desired image. For example, an ink set may include cyan, magenta, yellow and black ink. The inks are designed to be printed on adjacent areas on a print medium. The combined visual effect of the printed inks reproduces a full CMKY gamut of colors. However, color-to-color bleed between the adjacent colors in the image can produce undesirable blurring and feathering. This bleed reduces the quality of the image.

There are a variety of approaches that can be used to control color-to-color bleed. One approach is to add salts, such as $Ca(NO_3)_2$ and/or $Mg(NO_3)_2$, to dye based inks to reduce the tendency to bleed. Pigment based inks have a number of advantages over dye based inks, including better color stability and longer image life times. However, the addition of salts to pigment based inks does not reduce color-to-color bleeding in the same way that the salts reduce bleeding in dye based inks.

Another approach is to physically separate the inks by "depleting" the ink at color/color interactions. However, this approach reduces the color saturation of the image.

Yet another approach is to formulate each ink in the ink set with the same surfactant concentration and/or with darker colored inks having higher dynamic surface tension than lighter colored inks. The static surface tension between the darker colored inks and lighter colored inks could be equal. Conventional thinking is that this balance of fluid properties minimizes the tendency of the darker colors to migrate into the lighter colors when printed on a substrate. However, the inventors have unexpectedly discovered that this approach does not sufficient mitigate color-to-color bleed when applied to some ink sets. For example, an ink set included cyan, magenta, and yellow inks. The magenta and cyan inks use dispersant molecules that are bound to the pigment particles while the yellow ink uses a free polymer dispersant. The inventors discovered that when the yellow, cyan, and magenta inks had the substantially the same static surface tension and the same surfactant concentration, there was an unexpected and significant color-to-color bleed between the cyan/yellow inks and between the magenta/yellow inks. This color-to-color bleed unacceptably degraded the printed images. Additionally, the inventors found that performance varied with the substrate the ink was printed on.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

As used in the specification and appended claims, the terms "chemisorbed" or "bound" refers to a dispersant that is bound to an adjoining molecule by a chemical bond with a binding energy greater than approximately 0.5 electron volts. The term "chemisorbed" is interpreted broadly to include polymer dispersants that form bonds with other polymer dispersants to surround the pigment, as well as polymer dispersants that bind directly to pigments. The terms "physisorbed" or "free" refers to dispersants that have a weak tendency to bond with the pigments and exist in dynamic equilibrium in the carrier fluid of the ink. Dynamic equilibrium exists within the ink because the dispersants are constantly moving between a free floating state in the ink and being loosely bonded to the pigments. Thus, the state of the dispersants is dynamic. However, the ratio of the number of dispersants attached to the pigment and the number of dispersants that float in the fluid is relatively constant. Thus, the state of the dispersants within the ink is in equilibrium. In general, physisorbed dispersants will have a binding energy with the pigments of less than 0.5 electron volts and will be primarily attracted to the pigments via the van der Waals force.

The ink sets and principles described below provide printed images with high print quality by reducing or minimizing bleed from one ink printed onto a medium into another ink color printed adjacent thereto. The term "bleed," as used herein, is defined as the invasion of one color into another, once the ink is deposited on the print medium, as evidenced by a ragged border therebetween. Bleed occurs as colors mix either on the surface of the print medium (e.g., paper), within the print medium itself, within the deposited ink layer, or any combination of the preceding. The occurrence of bleed is particularly problematic between a darker ink (such as black, cyan, or magenta ink) and an adjacently-printed lighter ink (such as yellow) because the bleed of the darker in into the lighter ink is more visible. Hence, to improve print quality, it is desirable for bleed to be substantially reduced or eliminated such that borders between colors are clean and free from the invasion of one color into the other.

FIG. 1 is diagram of an inkjet printing system (100) that uses an ink set (130) to produce images on a print medium (170). As shown in FIG. 1, the present system includes a computing device (110) controllably coupled through a servo mechanism (120) to a moveable carriage (140) having an ink-jet print head (150) disposed thereon. In this example, the ink-jet print head (150) includes an ink set (130). The ink set (130) includes a number of ink reservoirs (130-1, 130-2, 130-3, 103-4), each of which contains a different ink. These various inks make up the ink set for this system. Because each of the inks in the ink set are printed by a common printer, onto a common substrate and are combined to form a common image on the substrate, the inks in the ink set are designed as one system. There are a variety of design parameters which are considered in designing an ink set. For example, durability, printability and image quality parameters such as color-to-color bleed can be considered. In the present system, the ink set (130) is designed to control color-to-color bleed on a wide variety of print mediums without compromising other parameters.

A number of rollers (180) are located adjacent to the ink-jet print head (150) configured to selectively position an ink receiving substrate (170). While the present system (100) is described in the context of applying a pigment-based ink-jet ink (160) onto an ink receiving medium (170), the present system and method may be used to mark any number of items with the present pigment-based ink-jet ink. The above-mentioned components of the present inkjet printing system (100) will now be described in further detail below.

The computing device (110) that is controllably coupled to the servo mechanism (120), as shown in FIG. 1, controls the selective deposition of a pigment-based ink-jet ink (160) on an ink receiving medium (170). A representation of a desired image or text may be formed using a program hosted by the computing device (110). That representation may then be converted into servo instructions that are then housed in a processor readable medium (not shown). When accessed by the computing device (110), the instructions housed in the processor readable medium may be used to control the servo mechanisms (120) as well as the movable carriage (140) and the ink-jet print head (150). The computing device (110) illustrated in FIG. 1 may be, but is in no way limited to, a workstation, a personal computer, a laptop, a personal digital assistant (PDA), or any other processor containing device.

The moveable carriage (140) of the present printing system (100) illustrated in FIG. 1 is a moveable material dispenser that may include any number of ink-jet material dispensers (150) configured to dispense the present pigment-based ink-jet ink (160). The moveable carriage (140) may be controlled by a computing device (110) and may be controllably moved by, for example, a shaft system, a belt system, a chain system, etc. making up the servo mechanism (120). As the moveable carriage (140) operates, the computing device (110) may inform a user of operating conditions as well as provide the user with a user interface.

As an image or text is printed on an ink receiving medium (170), the computing device (110) may controllably position the moveable carriage (140) and direct the ink-jet print head (150) to selectively dispense a pigment-based ink-jet ink at predetermined locations on the ink receiving medium (170) as digitally addressed drops, thereby forming the desired image or text. The ink-jet printhead (150) used by the present printing system (100) may be any type of ink-jet dispenser configured to perform the present method including, but in no way limited to, thermally actuated ink-jet dispensers, mechanically actuated ink-jet dispensers, electrostatically actuated ink-jet dispensers, magnetically actuated dispensers, piezoelectrically actuated dispensers, continuous ink-jet dispensers, etc.

The present system and methods provide ink-jet ink sets that have controlled color-to-color bleed between inks printed in adjacent areas on the print medium (170). The formation and composition of the pigment-based ink-jet ink (160) will now be described in detail below.

FIGS. 2A and 2B show color-to-color bleed between a first ink printed adjacent to a second ink on test coupons. A first coupon (200) shows two cyan lines (210) printed adjacent to thicker yellow lines (220). The bleeding of the cyan lines (210) into the yellow lines (220) is visible feathering that extends away from the cyan lines (210). This increases the line width (225) of the cyan lines (210). This color-to-color bleed reduces image quality and results in blurring of line edges, shifts in color, and reduction in overall image quality. As discussed below, the ink set tested on this coupon is includes cyan and yellow ink with substantially identical static surface tension and surfactant concentration but with different dispersion systems.

FIG. 2B shows a second coupon (205) that shows two cyan lines (212) printed adjacent to thicker yellow lines (222). There is minimal bleed from the cyan lines (212) into the yellow lines (222) in this example. The width of the cyan lines (230) remains substantially the same as when they were initially printed. As described below, this substantial improvement in color-to-color bleed results from increasing the amount of surfactant in the yellow ink according to principles described herein.

Illustrative Ink Set Compositions

Ink jet inks typically include a colorant dispersed in a liquid vehicle. For aqueous inks, the carrier vehicle is water, which makes up from about 30% to about 95% of the total weight of the ink. The colorant (dye, pigment, or combination thereof), may be added to the ink in an amount generally ranging from about 0.1 to about 15%, from about 0.2 to about 10%, or from about 0.5 to about 5%, by weight, based on the total weight of the ink.

In one example, the inks are configured to make up an ink set including at least one of each of black, cyan, magenta, and yellow inks. However, ink sets may include a variety of additional or alternative inks. For example, an ink set may include "lighter" versions of any one or more of the black, cyan, magenta, or yellow inks; such as gray, medium and/or light gray, medium and/or light cyan, medium and/or light magenta, and medium and/or light yellow. The lighter inks may comprise the same or different colorants than that of their respective darker ink versions.

As used herein, the term "pigment" refers to a colorant that is insoluble in the aqueous vehicle, and includes self-dispersed pigments, using various dispersion chemistries (e.g., by way of polymeric dispersion, ionic dispersion, surface modified dispersion, to name a few). A wide variety of organic and inorganic pigments, alone or in combination, may be selected to make the ink. The dispersed pigment particles are sufficiently small to permit free flow of the ink through the inkjet printing device, especially when small diameter ejecting nozzles with diameters ranging from 10 microns to 50 microns are used. The particle size also has an influence on the pigment dispersion stability. The range of useful particle size is approximately 0.005 microns to 15 microns.

In general, components that make up an inkjet ink may include a carrier fluid, pigment colorants, salts, surfactants, biocides, buffers, viscosity modifiers, sequestering agents, stabilizing agents, polymers, UV curable materials, viscosity modifiers, humectants, plasticizers, etc. In some embodiments, dye based colorants may be used in combination with the pigment colorants. The ink-jet ink compositions of the present system and method are typically prepared using an aqueous formulation or liquid vehicle which can include water, co-solvents, surfactants, buffering agents, biocides, sequestering agents, and/or other additives. Additionally, binders and solids can be present in the ink vehicle, such as pigment solids and other polymeric solids.

With respect to the co-solvent content, co-solvents for use in the present system and method include, but are in no way limited to, aliphatic alcohols, aromatic alcohols, diols, glycols, imidazoles, pyrrolidinones, glycol ethers, poly(glycol) ethers, glycerine, ethers, esters, organosulfoxides, sulfones, alcohol derivatives, cellosolve, ether derivatives, amino alcohols, and/or ketones. For example, co-solvents can include, but are in no way limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides.

Specific examples of co-solvents that may be employed in the practice of the present system and method include, but are not limited to, 1,5-pentanediol, 2-pyrrolidone, propylene glycol n-butyl ether, Liponic ethylene glycol 1, Liponic ethylene glycol 7, 2-methyl-2,4-pentanediol, 2-methyl-1,3-propanediol, 2-ethyl-2-hydroxymethyl-1,3-propanediol, diethylene glycol, 3-methoxybutanol, and 1,3-dimethyl-2-imidazolidinone. Co-solvents can be added to reduce the rate of evaporation of water in the ink to minimize clogging or modify other properties of the ink such as viscosity, pH, surface tension, optical density, and print quality, among others.

Various buffering agents can also be optionally used in the ink-jet ink compositions of the present system and method. Typical buffering agents may include, but are in no way limit to, organic-based "biological buffers" that have been widely used in chemical and biological sciences or inorganic buffers. Further, the buffers employed should provide a pH ranging from about 6 to about 10 in the practice of the present system and method, preferably about 7.5 to about 9.5. If used, buffering agents typically comprise less than approximately 10 wt % of the ink-jet ink composition.

In another exemplary aspect of the present system and method, various biocides can be used to inhibit growth of undesirable microorganisms. Several examples of suitable biocides include, but are in no way limited to, benzoate salts, sorbate salts, commercial products such as KORDEK MLX (Dow Chemical Company), NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the ink-jet ink composition and often from about 0.05 wt % to about 2 wt %.

The inks may also include a number of additional components such as dispersants and surfactants. As used herein, the term "dispersed" shall mean any mechanism by which a component, such as the colorant, is dispersed, dissolved, solubilized, mixed, or otherwise is made able to be carried by the vehicle. Dispersants in the ink can act in a number of ways to prevent aggregation of the ink particles. For example, the pigment particles may use electrostatic stabilization where the particles have a surface charge with the same polarity. This surface charge tends to repel similarly charged particles.

Steric stabilization relies on adsorption of a layer of resin or polymer chains on the surface of the pigment. The resin or polymer chains prevent the pigments from coming into close proximity with each other. A wide range of polymers may be used, including polymers with terminal function groups that chemically bond to the surface of the pigment, block copolymers, and random copolymers. These polymeric dispersants may have relatively high molecular weight. Single polymer dispersant molecules may bind to the pigment at multiple sites. In other embodiments, the polymer dispersant may not directly bond with just the particle. Additionally or alternatively, the polymer dispersant may bond (polymerizes) with other polymer dispersants or itself. This polymerization traps the pigment particles and prevents them from conglomerating (flocculating). In other implementations, the polymer dispersant may be a free polymer dispersant that in equilibrium with the pigment and the liquid vehicle. A portion of the free polymer dispersant is physisorbed by the pigments and the remainder of the polymer dispersant is free floating with liquid vehicle. Physisorption is a bond that barely perturbs the electronic structure of an atom or molecule. The fundamental interacting force of physisorption is the van der Waals force. The physisorbed dispersants can interchange places with the polymers in the liquid relatively easily.

The polymer dispersants may include, but are not limited to: nonionic hydrocarbon surfactants such as the TETRONIC® series (tetrafunctional block copolymers of propylene oxide, ethylene oxide such as Tetronic 701, ethylene diamine) available from BASF Canada (Toronto, Ontario) and the BRIJ® series (polyethoxylated alcohols and esters) such as Brij 30 available from ICI Americas (Wilmington, Del.), proprietary polymers, or other appropriate dispersant.

Surfactants are additives that lower the surface tension of the ink. Surfactants may be added to inkjet inks to modify the properties of the ink at an interface including, but in no way limited to, improving wetting qualities, controlling foam, and/or modifying viscosity. Examples of surfactants are the TERGITOL® series (alkyl polyethylene oxides) available from Union Carbide Co. (Houston, Tex.) such as Tergitol 15-S-5, 15-S-7, and TMN6. In one example, the surfactant may include polyethylene glycol trimethylnonyl ether (CAS#60828-78-6) in amounts greater than 87% by total weight of the surfactant, polyethylene glycol (CAS#25322-68-3) in amounts less than 3% by total weight of the surfactant, and 4-Nonanol, 2,6,8-trimethyl (CAS#123-17-1) in amounts less than 2% by total weight of the surfactant, with the balance being water.

The individual components of the present exemplary inkjet ink system will be described in further detail below. According to one embodiment, the ink sets may have the composition shown below in Table 1. However, the compositions listed in Table 1 are only examples. A variety of other compositions could also be used to apply principles described herein to control color-to-color bleed.

TABLE 1

| Ingredient | CAS # | Cyan | Magenta | Yellow |
| --- | --- | --- | --- | --- |
| Tergitol TMN6 | 60828-78-6 | 0.6-0.8 | 0.6-0.8 | 0.45-0.9 |
| 2P | 616-45-5 | 9 | 9 | 5 |
| Dantocol DHE | 26850-24-8 | | | 5 |
| EHPD | 77-99-6 | 10 | 10 | 10 |
| Glycerol | 56-81-5 | 4 | 4 | |
| LEG | 31694-55-0 | 0.75 | 0.75 | |
| Kordek MLX | 2682-20-4 | 0.14 | 0.14 | 0.14 |
| Proxel GXL | 2634-33-5 | 0.1 | 0.1 | 0.1 |
| Colorant | | 2.8 | 4.8 | 3.45 |
| Water | 7732-18-5 | Balance | Balance | Balance |

Table 1 describes illustrative compositions of an ink set, with all components listed as percent weights of the total ink. Available Chemical Abstracts Service (CAS) numbers are listed to specifically identify the various components. The ink set includes cyan, magenta, and yellow inks. In this example, all the inks include deionized water as the carrier fluid. The colorants used in the inks can include any of a number of pigments available in the appropriate colors. For example, the cyan colorant may be an aqueous pigment dispersion such as Pro-Jet™ Cyan ADP 2000 from FUJIFILM Imaging Colorants. The Pro-Jet™ Cyan ADP 2000 pigment is chemically modified with a reactive dispersant. The reactive dispersant includes a polymer that is adsorbed onto the surface and crosslinked to entrap the pigment particle. Throughout the specification and appended claims, adsorption/crosslinking is described as the dispersant being "bound" or "chemisorbed" to the pigment particle. This binding may add a number of benefits including lesser dependency on surface chemistry and greater stability by eliminating desorption. Similarly, the magenta ink includes Pro-Jet™ Magenta ADP 1100 from FUJIFILM Imaging Colorants. The magenta ink also includes reactive dispersants. The yellow ink includes a yellow dispersion such as HPJ-Y001 from the DIC Corporation. The dispersion includes a yellow pigment dispersed in water. However, the yellow dispersion does not include a reactive dispersant. Instead the yellow dispersion includes a free polymer dispersant, such as styrene acrylic co-polymer.

All the inks include a biocide and bactericide (Proxel® GXL available from ArchLonza, Inc., Kordek® from the DOW Chemical Company). Proxel® is a biocide that is based on 1,2-Benzisothiazolin-3-one (BIT) and is available in a wide range of different formulations. For example, Proxel® GXL is a solution of BIT in dipropylene glycol and water. CAS number listed for Proxel is for the active ingredient, 1,2-Benzisothiazolin-3-one (BIT).

The cyan and magenta inks include a humectant Liponic Ethylene Glycol 1 (LEG), and a conditioner (glycerol) The yellow ink includes a solvent such as di-(2-hydroxyethyl)-5,5-dimethylhydantoin (Dantocol DHE® from ArchLonza, Inc.). The inks also contain the co-solvents, 2-Pyrrolidinone (2P) and trimethylolpropane EHPD, and a surfactant (Tergitol TMN6 ®, available from the DOW Corporation), The 2P, EHPD, LEG, and glycerol are widely available materials that can be obtained from a range of commercial suppliers.

The inks described above were prepared by weighing out pigment or a pigment dispersion into a container according to the amounts described above. Then the solvents, binder, and water are mixed and the pH adjusted to >pH 8.5. While stirring the pigments, the mixture of solvents, binder and water is slowly added. Stirring continues for at least 30 minutes. The pH was checked after one hour and appropriate adjustments were made to bring the pH below 8.5. Ingredient amounts are in weight percent of the total weight of ink. As shown below, the amount of surfactant is varied in the different ink sets that were tested. The materials and amounts given above are only illustrative. The principles described herein can be applied to inks with a wide variety materials and compositions.

Test Results

Table 2 shows a number of illustrative ink sets that were tested for color-to-color bleed. The specific materials and compositions of the inks are given above in Table 1. The amount of surfactant (Tergitol® TMN6) was varied between inks. For example, in test 1, the yellow ink included 0.45 parts of TMN6 and the cyan and magenta inks included 0.6 parts of TMN6. The entry for test 1 also includes the media type (HPMP) and the measurements of bleed from cyan to yellow (C2Y) and bleed from magenta to yellow (M2Y). The various media types are HPMP (Hewlett-Packard Multi-purpose Paper, 20#), HPPP (Hewlett-Packard Printing Paper, 20#), and HCP (Hammermill Copy Plus 20#). The bleed measurements are derived from the increase in line widths on test coupons similar to those shown in FIGS. 2A and 2B.

TABLE 2

| Test Number | Media | Yellow | Cyan | Magenta | Bleed from C2Y | Bleed from M2Y |
| --- | --- | --- | --- | --- | --- | --- |
| Test 1 | HPMP | 0.45 | 0.6 | 0.6 | 22 | 13 |
| Test 2 | HPMP | 0.6 | 0.6 | 0.6 | 9 | 10 |
| Test 3 | HPMP | 0.8 | 0.8 | 0.8 | 10 | 8 |
| Test 4 | HPMP | 0.6 | 0.8 | 0.8 | 21 | 13 |
| Test 5 | HPMP | 0.8 | 0.6 | 0.6 | 6 | 3 |
| Test 6 | HCP | 0.45 | 0.6 | 0.6 | 45 | 23 |
| Test 7 | HCP | 0.6 | 0.6 | 0.6 | 38 | 15 |
| Test 8 | HCP | 0.8 | 0.6 | 0.6 | 9 | 5 |
| Test 9 | HPPP | 0.45 | 0.6 | 0.6 | 18 | 12 |
| Test 10 | HPPP | 0.6 | 0.6 | 0.6 | 13 | 12 |
| Test 11 | HPPP | 0.8 | 0.6 | 0.6 | 13 | 6 |

Figure 3:
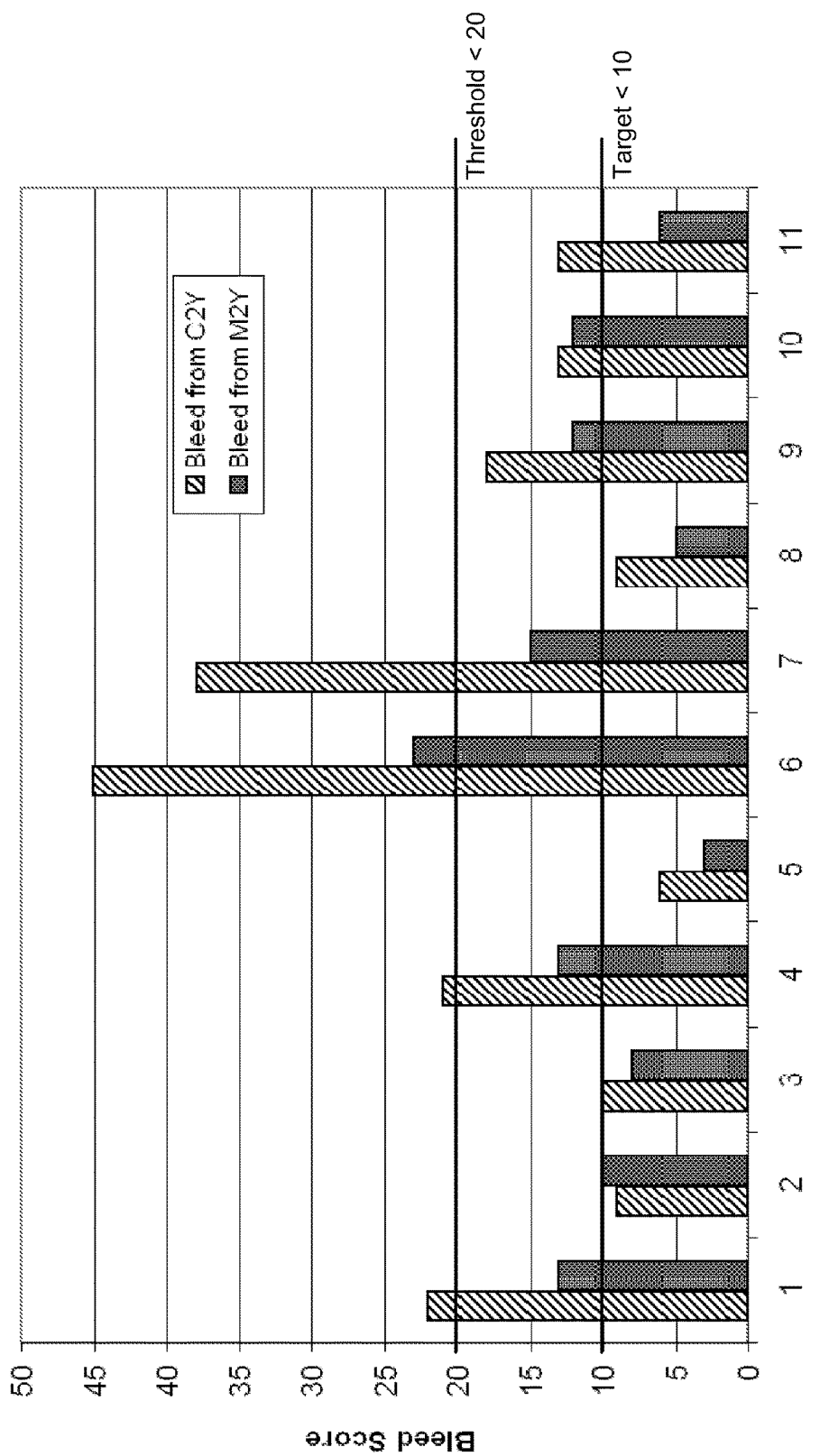
FIG. 3 is a chart showing color-to-color bleed test results between inks in ink sets, according to one example of principles described herein.

FIG. 3 is a bar graph that shows the bleed results listed on Table 2. The bleed from the cyan to the yellow is shown as bars with diagonal hash marks and the bleed from magenta to the yellow is shown as the shaded grey bars. The graph also includes threshold and a target level for color-to-color bleed. The threshold between acceptable and unacceptable bleeds is a bleed score of 20. Bleed scores above 20 are unacceptable. The target level of bleed is bleed scores less than 10. Tests 1, 4, 6, and 7 had at least one bleed score that was above the threshold of 20. Consequently formulations of these ink sets result in unacceptable color-to-color bleed. In three of these unacceptable formulations (tests 1, 4, and 6) the amount of surfactant in the yellow ink was lower than the amount of surfactant in the cyan and magenta. In the last test (test 7), the amount of surfactant in all the inks was the same. According to the conventional approach, formulations with equal amounts of surfactants in all the inks should perform the best. However, the inventors unexpectedly discovered that this was not the case. In fact, ink set compositions that had the same amount of surfactant in all of the inks (tests 2, 3, 7, and 10) typically performed worse than ink compositions where the yellow had more surfactant than the cyan and magenta (tests 5, 8, and 11). The best performing ink sets are tests 5, 8 and 11 for the respective media, where the yellow ink has 0.8 parts of TMN6 surfactant and cyan and magenta inks have 0.6 parts of TMN6 surfactant.

Figure 4A:
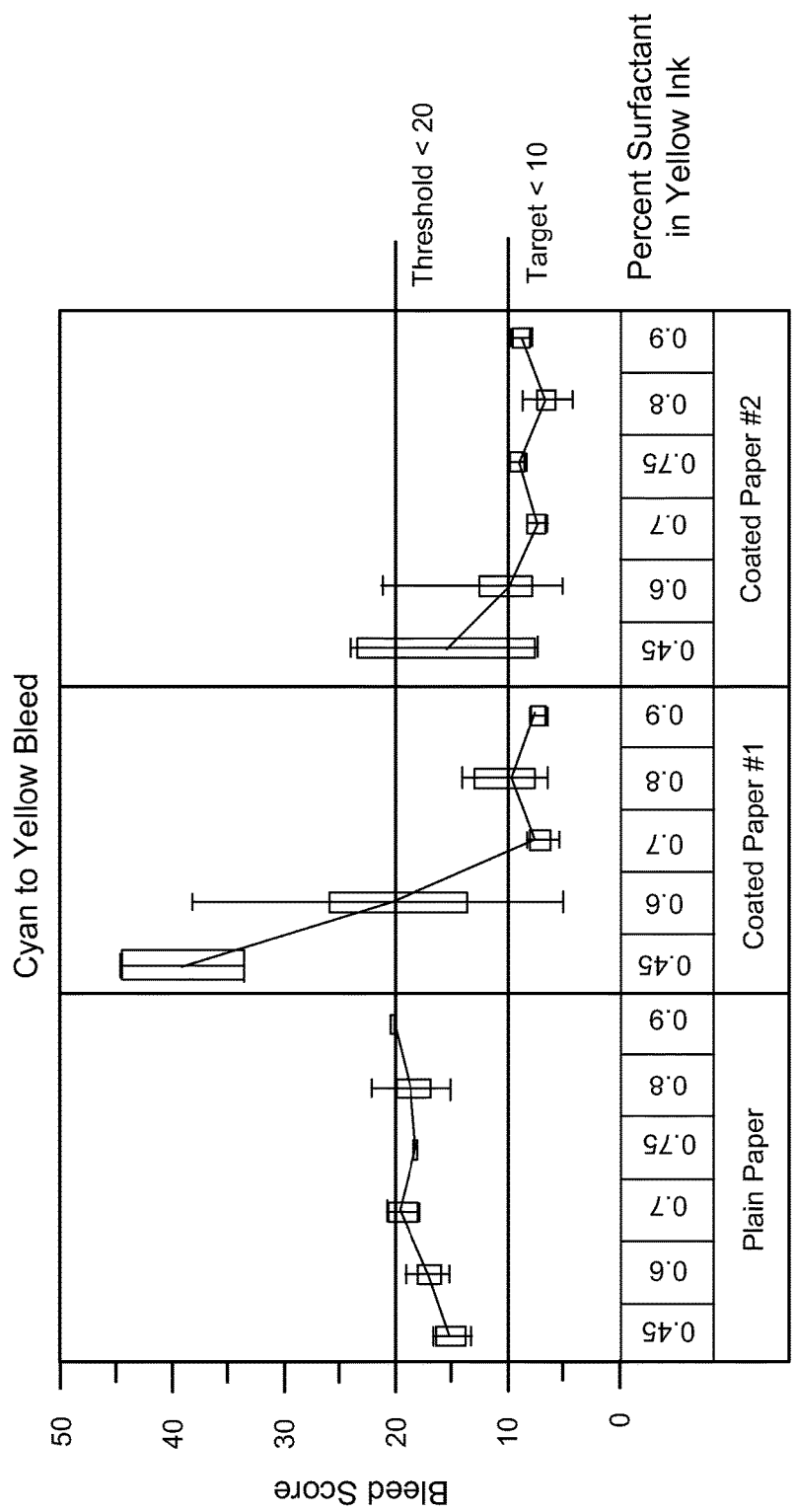
FIGS. 4A and 4B are charts showing color-to-color bleed on several substrates, according to one example of principles described herein.
Figure 4B:
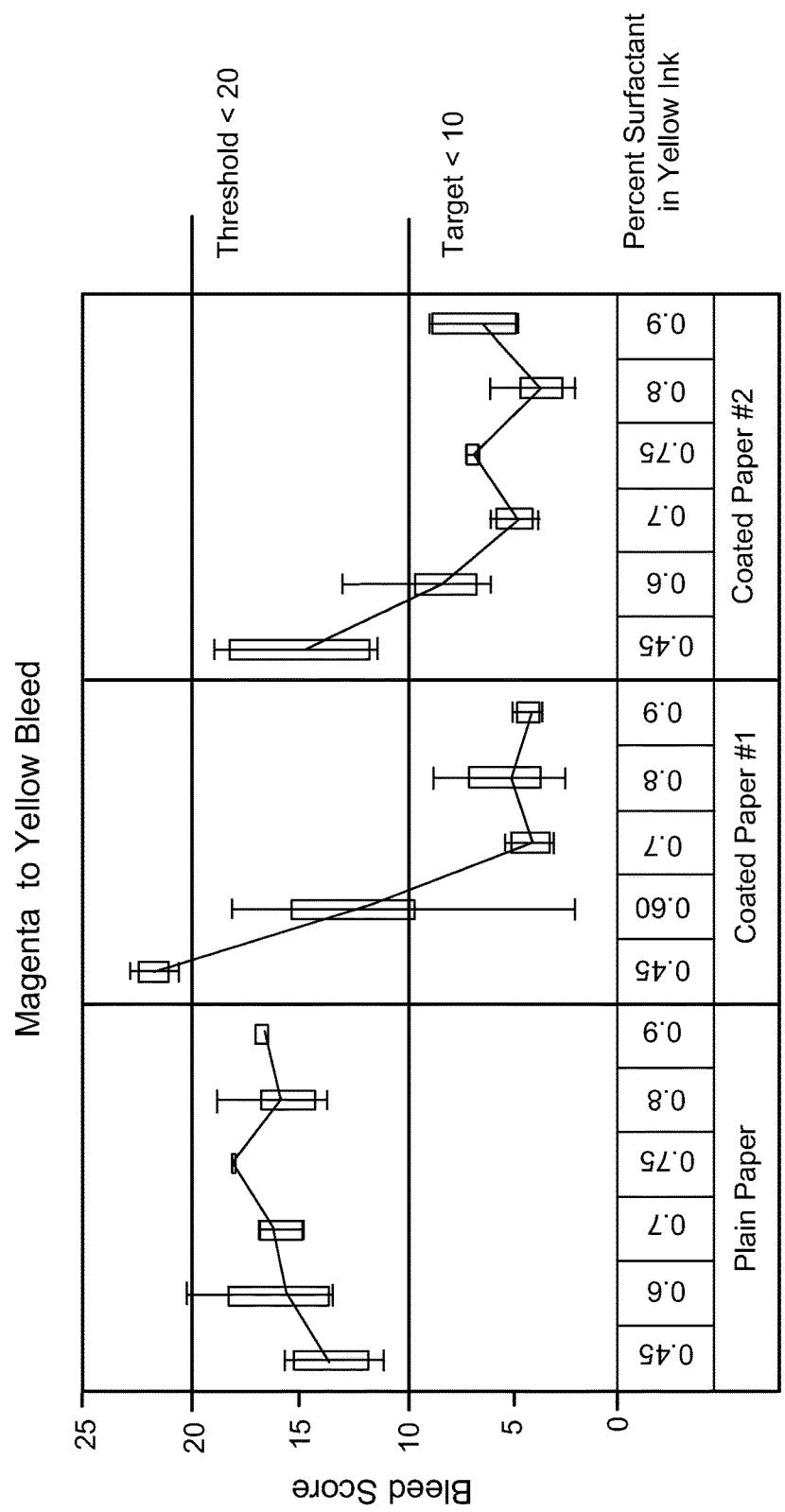

FIGS. 4A and 4B show additional bleed score data for tests ink sets with varying levels of TMN6 surfactant in the yellow ink. The amount of surfactant in the cyan and magenta inks was 0.6 parts for all tests. Other components in the inks are shown in Table 1 above. In FIG. 4A, test results for bleed from the cyan ink into the yellow ink are given.

In a first set of tests, the bleed test pattern was printed on plain paper. The term "plain paper" refers to uncoated substrates. For example, this plain paper may be DOMTAR uncoated paper. A variety of other uncoated papers could also be used with similar results. The amount of TMN6 in the yellow ink was varied from 0.45, 0.6, 0.7, 0.75, 0.8 and 0.9 percent of the total weight of the ink. The chart summarizes information from a large number of tests, with the boxed areas encompassing the middle 50% of the data points and the bars showing the maximum and minimum data values. The bleed scores for printing on plain paper increase somewhat as the amount of TMN6 surfactant in the yellow ink increases. Thus, the color-to-color bleeding trend for printing on this illustrative plain paper is for increasing levels of surfactant to produce greater color-to-color bleed. However, all of the data indicates that the substantial majority of bleeding scores are below the acceptance threshold (a bleed score of less than 20) for surfactant amounts that are equal to or less than 0.9 percent.

In a second set of tests, the bleed test pattern was printed on coated Paper #1 (Hammermill Copy Plus®). The term "coated" paper refers to a substrate, typically formed from cellulose or synthetic fibers that has been coated and/or chemically treated. The coatings may impart specific qualities to the paper such as higher binding to ink pigments and lower ink absorbency. In some examples, the coatings may include pigments and whiteners that are adhered to the substrate by binders. For example, Hammermill Copy Plus® is a coated paper that incorporates ColorLok® additives. The amount of TMN6 in the yellow ink was varied from 0.45, 0.6, 0.7, 0.8 and 0.9 percent of the total weight of the ink. The bleed scores rapidly decrease as the amount of surfactant in the yellow ink increases. In this example, all tests where the yellow ink has surfactant values that are 0.7% or more fall under the threshold (bleed score of less than 20).

In a third set of tests the bleed test pattern was printed on Coated Paper #2(Hewlett Packard Multipurpose Paper®, which also incorporates ColorLok® additives). The amount of TMN6 in the yellow ink was varied from 0.45, 0.6, 0.7, 0.75, 0.8 and 0.9 percent of the total weight of the ink. The chart shows that for all tests with yellow surfactant values that were greater than 0.7%, the bleed from cyan to yellow was under the target value of 10.

In FIG. 4B, test results for bleed from the magenta ink into the yellow ink are given. The group of tests to the left printed on plain paper (DOMTAR uncoated paper). A variety of other uncoated papers could also be used. The amount of TMN6 in the yellow ink was varied from 0.45, 0.6, 0.7, 0.75, 0.8 and 0.9 percent of the total weight of the ink. The bleed scores for printing on plain paper increase somewhat as the amount of surfactant in the yellow ink increases. Thus, the trend on this illustrative plain paper was for increasing levels of surfactant to produce greater color-to-color bleed. However, all of the data indicates that the substantial majority of bleeding is below the under the threshold (bleed score of less than 20).

The group of tests in the center was generated by inks printed on Coated Paper #1 (Hammermill Copy Plus®). The amount of TMN6 in the yellow ink was varied from 0.45, 0.6, 0.7, 0.8 and 0.9 percent of the total weight of the ink. The bleed scores rapidly decrease as the amount of surfactant in the yellow ink increases. In this example, all tests with yellow ink surfactant values that are 0.7% or more fall under the target level of 10.

In the set of tests to the right, the magenta to yellow bleed test pattern was printed on Coated Paper #2 (Hewlett Packard Multipurpose Paper®). The amount of TMN6 in the yellow ink was varied from 0.45, 0.6, 0.7, 0.75, 0.8 and 0.9 percent of the total weight of the ink. The chart shows that for all tests with yellow surfactant values that were equal to or greater than 0.7% the bleed from cyan to yellow was under the target value of 10.

Without being bound to any particular theory, it appears that the difference in dispersants used by the yellow ink and cyan/magenta inks may influence the bleed. Typically inks in an ink set utilize a common dispersion and surfactant composition. However, as discussed above, the yellow ink in these examples utilizes a free polymer dispersant that is only weakly bound to the yellow pigment. In contrast, the cyan/magenta inks utilize a polymerized dispersants that bind to each other and to the pigment particles. During manufacturing of polymerized dispersants, the dispersants are joined to the pigments and unbound dispersants are removed from the pigments. This ensures that the pigments that have been surface modified by the polymerized dispersants do not include any significant amount of free dispersant. Consequently, when the cyan and magenta inks are formulated with the pigments with bound dispersants, the cyan and magenta inks do not contain significant amounts of free dispersant.

It is hypothesized that the free polymer dispersant in yellow ink is attracted to the air/ink surface of the yellow ink and competes with the surfactants that would normally be present at the surface. Thus, the presence of free entities, such as polymer dispersants, may interfere with the action of the surfactant. As shown above, increasing the amount of the surfactant in the yellow ink has been found to reduce the tendency of the cyan and magenta inks to bleed into the yellow ink.

In one implementation, the surfactant may generally be added to the ink with free dispersants in an amount greater than the amount of surfactant in inks without free dispersants. For example, the ink with free dispersants may include an amount of surfactant that generally ranges from 10% to 50% greater than the amount of surfactant in the inks without free dispersants. In another example, the amount of surfactant in the ink with free dispersants may generally range from about 16% to 34% more than the other inks in the ink sets that do not contain free dispersants. For example, a first amount of the surfactant in a first ink with chemically adsorbed dispersants comprises between 0.45% and 0.7% by weight of the first ink. The second amount of the surfactant in a second ink in the ink set with free dispersants comprises between 0.7% and 0.9% by weight of the second ink.

The tests above illustrate that by increasing the surfactant in the yellow ink, the color-to-color bleed of ink printed on coated paper is dramatically reduced, while the color-to-color bleed on plain paper remains within acceptable tolerances. In these examples, different amounts of the same surfactant are used in all of the color inks in the ink set.

Table 3, below, shows static surface tension measurements of a number of ink sets. The static surface tension measurements are given in units of milliNewtons per meter (mN/m). The compositions of all of the inks are given above in Table 1. The only substantial variations between the inks were the amounts of surfactant TMN6 in the inks. The measurements were made using the plate method with a KRUSS Digital tensiometer, model K10ST.

TABLE 3

Static Surface Tension Measurements

| Ink Set | Cyan | Magenta | Yellow | Cyan – Yellow | Magenta – Yellow |
|---|---|---|---|---|---|
| Control Ink Set | 33.4 | 33.1 | 33.1 | 0.3 | 0 |
| Balanced Ink Set | 32.4 | 31.7 | 32.2 | 0.2 | −0.5 |
| Spiked Ink Set | 33.4 | 33.1 | 32.2 | 1.2 | 0.9 |

In a control ink set, the surfactant amounts in the cyan, magenta and yellow inks were 0.6% by total weight of the inks. This resulted in the cyan ink having a surface tension of 33.4, the magenta ink having a surface tension of 33.1, and the yellow ink having a surface tension of 33.1. The difference between the cyan ink and the yellow ink static surface tensions was 0.3 and the difference between the magenta ink and yellow ink static surface tensions was 0.

In the balanced ink set, the surfactant amounts in the cyan, magenta, and yellow inks were equal at 0.8% by weight percent. This resulted in cyan having a surface tension of 32.4, magenta having a surface tension of 31.7, and yellow having a surface tension of 32.2. The difference between the cyan and yellow static surface tensions was 0.2 and the difference between the magenta and yellow static surface tensions was −0.5. For most media tested, the bleed from the cyan to the yellow and from the magenta to the yellow was significantly worse in the balanced ink set than in the control ink set.

In the spiked ink set, the composition and amounts of surfactant in the cyan and magenta inks were 0.6%. However, the amount of surfactant in the yellow ink was increased ("spiked") by approximately 33% from 0.6% to 0.8%. This resulted in a reduction in the surface tension of yellow ink to 32.2. The difference between the cyan and yellow static surface tensions was 1.2 and the difference between the magenta and yellow static surface tensions was 0.9. The bleed results of the spiked ink set are shown in FIG. 2B and tests 5, 8, and 11 in FIG. 3. The bleed performance of the spiked ink set was significantly better than the either the control ink set or the balanced ink set.

The principles described above include allowing for different dispersion approaches to be used in inks that are in the same ink set without sacrificing color-to-color bleed performance. This allows for a broader range of inks to be combined to form a more optimal ink set. In some implementations, the ink in the ink set that includes more free dispersant species can include more surfactant than other inks with less dispersants. In some implementations, bleed of darker colored inks in an ink set, such as cyan and magenta, into lighter colored inks, such as yellow, may be more noticeable than other color-to-color bleeding. Consequently, the amount of surfactant in the lighter inks can be increased to improve the image quality of the prints.

Figure 5:
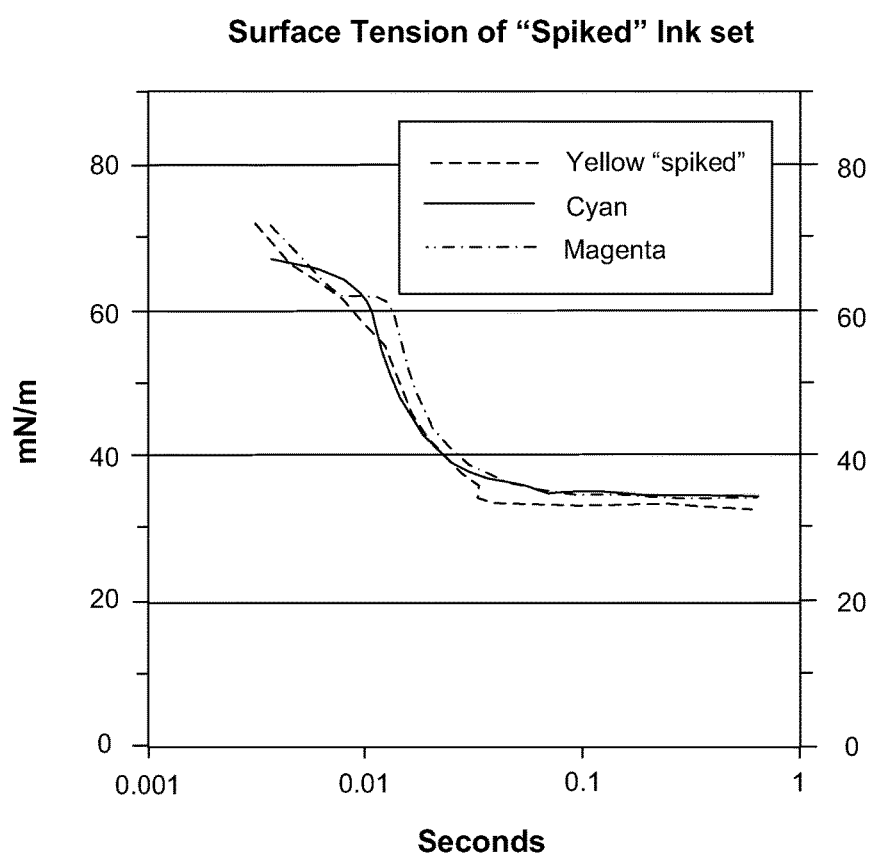
FIG. 5 is a chart showing surface tension of an ink set as a function of time, according to one example of principles described herein.

FIG. 5 shows measurements of the surface tension of the "spiked" ink set described above as a function of time. In this example, the ink set has the composition described in Table 1 and the surfactant amounts listed for test 5 in Table 2. The surface tension was measured on a KRUSS Bubble Pressure tensiometer model BP2 and shows both dynamic and static surface tension measurements. The surface tension tests showed that the short term ("dynamic") surface tensions of the inks were varied over time but the yellow dynamic surface tension of the ink was not generally lower than the dynamic surface tension of the cyan and magenta inks. This is shown by the generally overlapping and crossing curves from zero to approximately 0.05 seconds of the test.

In contrast, the long term ("static") surface tensions of the inks showed significant differences. This is shown by the separated lines between approximately 0.05 seconds to one second. The yellow ink has a significantly lower static surface tension than either the cyan or magenta inks. The inventors have found that when the static surface tension of the yellow ink was <2 mN/m lower than the static surface tension of the cyan and magenta inks, the color-to-color bleed on both the coated media and the plain media was acceptable. This difference in the static surface tension is produced by varying the amount of the surfactant between different inks. This preserves other image quality factors and color saturation without resorting to the use of fluorosurfactants which produce environmental and regulatory challenges.

Without being bound to any particular theory, it appears that one possible reason for the reduction of the surface tension as a result of increasing the amount of TMN6 surfactant is that the amount of TMN6 in the ink systems is below the Critical Micelle Concentration (CMC). Micelles are aggregates of surfactant molecules in a liquid. These micelles tend to form when the concentration of the surfactant exceeds a concentration threshold that is dependent on molecular characteristics, temperature, pH and other factors. After reaching the CMC, the surface tension remains relatively constant regardless of the increases in surfactant concentration. This is because the additional surfactant molecules aggregate into micelles and have less contact with the surrounding fluid. Because the concentrations listed for the surfactant (generally between 0.45% and 0.9%) are less than the CMC, adding more surfactant to the ink decreases the static surface tension of the ink.

FIG. 6 is a flow chart of an illustrative method for making an ink set with color-to-color bleed control on media. A first ink in the ink set is formed by adding a carrier fluid and a first amount of a surfactant and carrier fluid to pigment with chemisorbed (bound) dispersants and mixing (block 605). Additional ingredients may also be included as indicated above. The mixing may be accomplished in any of a number of ways and may include heating, agitation, milling, applying sonic energy and other techniques. A second ink in the ink set is formed by adding carrier fluid and a second amount of the surfactant to pigments with physisorbed (free) dispersants and mixing (block 610). The second amount of surfactant is greater than the first amount of surfactant by 16% to 34% and the second ink has a static surface tension that is lower than the surface tension of the first ink by <2 mN/m. The first ink and the second ink can then be used by a printer to form a desired image where the first ink and second ink are printed on adjoining locations on a substrate. As graphically demonstrated in FIGS. 2A, 2B, 4A and 4B, the first ink and second ink exhibit reduced color-to-color bleed on coated papers and acceptable but increasing color-to-color bleed on plain papers.

In conclusion, an ink set that includes inks with different dispersants can be modified to control color-to-color bleed by increasing the amount of surfactant in inks with more free dispersants. This reduces the surface tension of the inks with more free dispersants and reduces the tendency of inks to bleed when printed adjoining each other on coated papers.

The preceding description has been presented only to illustrate and describe examples of the principles described.

This description is not intended to be exhaustive or to limit these principles to any precise form disclosed. Many modifications and variations are possible in light of the above teaching.

What is claimed is:

1. An ink set with color-to-color bleed control on media comprising:
   a first ink in the ink set comprising: a first pigment, a dispersant bound to the first pigment, and a first amount of a surfactant; and
   a second ink in the ink set comprising: a second pigment, a free dispersant, and a second amount of the surfactant greater than the first amount of the surfactant,
   in which the second amount of the surfactant comprises 10% to 50% more of the surfactant than the first amount of surfactant, and the first and second surfactants are assessed based on the weight percentages of the surfactants in the first and second inks respectively.

2. The ink set of claim 1, in which the second amount of the surfactant comprises 16% to 34% more surfactant than the first amount of the surfactant, in which both the first amount of the surfactant and the second amount of surfactant are less than the critical micelle concentration for the first ink and the second ink and the first and second surfactants are assessed based on the weight percentages of the surfactants in the first and second inks respectively.

3. The ink set of claim 1, in which the ink set is a pigment based ink set.

4. The ink set of claim 3, in which the bound dispersant is chemically adsorbed to the first pigment in the first ink.

5. The ink set of claim 3, in which a portion of the free dispersant is physically adsorbed to the second pigment.

6. The ink set of claim 1, in which the second ink is a lighter colored ink than the first ink and has a static surface tension that is lower than the surface tension of the first ink by <2 mN/m.

7. The ink set of claim 1, in which the first ink comprises one of a cyan pigment and a magenta pigment and the second pigment comprises a yellow pigment.

8. The ink set of claim 1, in which the free dispersant comprises a free polymer dispersant.

9. The ink set of claim 1, in which the free dispersant comprises styrene acrylic polymer and the surfactant comprises polyethylene glycol trimethylnonyl ether.

10. The ink set of claim 1, in which the second ink comprises a pigment and a carrier fluid, in which the free dispersant is in dynamic equilibrium with the second pigment and the carrier fluid.

11. The ink set of claim 1, further comprising a third ink comprising: a third pigment; a dispersant bound to the third pigment; and the first amount of the surfactant.

12. A color ink set with reduced color-to-color bleed comprising:
   a first ink comprising:
      a first carrier fluid;
      a first pigment dispersed in the carrier fluid;
      a first dispersant chemically adsorbed to the first pigment; and
      a first amount of a surfactant; and
   a second ink comprising:
      a second carrier fluid;
      a second pigment dispersed in the carrier fluid;
      a free second dispersant in dynamic equilibrium with the second carrier fluid and the second pigment, in which at least a portion of the free second dispersant is physically adsorbed to the second pigment; and
      a second amount of the surfactant greater than the first amount of surfactant by 16% to 34%, in which the first amount of the surfactant and the second amount of surfactant are less than the critical micelle concentration for the first ink and the second ink, the second ink having a static surface tension that is lower than the surface tension of the first ink by <2 mN/m, in which increasing amounts of the surfactant in the second ink result in lower color-to-color bleed when printed on coated paper and slightly higher color-to-color bleed on plain paper, and the first and second surfactants are assessed based on the weight percentages of the surfactants in the first and second inks respectively.

13. The color ink set of claim 12, in which:
   the first pigment comprises one of a cyan pigment and a magenta pigment;
   the second pigment comprises a yellow pigment;
   the first carrier fluid and the second carrier fluid comprise water;
   the surfactant comprises polyethylene glycol trimethylnonyl ether, in which the first amount of the surfactant comprises between 0.45% and 0.70% by weight of the first ink and the second amount of the surfactant comprises between 0.70% and 0.9% by weight of the second ink; and
   the free dispersant comprises styrene acrylic co-polymer.

14. A method for forming an ink set with color-to-color bleed control on media comprises:
   forming a first ink in the ink set by adding carrier fluid and a first amount of a surfactant to pigment with chemisorbed dispersants and mixing;
   forming a second ink in the ink set by adding carrier fluid and a second amount of the surfactant to pigments with physisorbed dispersants and mixing, in which the second amount of surfactant is greater than the first amount of surfactant by 16% to 34%, the second ink having a static surface tension that is lower than the surface tension of the first ink by <2 mN/m, and the first and second surfactants are assessed based on the weight percentages of the surfactants in the first and second inks respectively.

15. The method of claim 14, further comprising forming a third ink in the ink set by adding carrier fluid and the first amount of the surfactant to a third pigment and mixing, in which the third pigment comprises chemisorbed dispersants.

16. The ink set of claim 1, in which the first amount of surfactant comprises 0.45% to 0.70% by weight of the first ink and the second amount of surfactant comprises 0.7% to 0.9% by weight of the second ink.

17. The ink set of claim 1, in which the first and second inks do not contain a fluoro-surfactant.

18. The ink set of claim 8, in which the free dispersant comprises styrene acrylic co-polymer.

* * * * *